United States Patent
Pflug et al.

(10) Patent No.: US 9,008,872 B2
(45) Date of Patent: Apr. 14, 2015

(54) CONFIGURING LANDING SUPPORTS FOR LANDING ON UNEVEN TERRAIN

(71) Applicant: The Boeing Company, Chicago, IL (US)

(72) Inventors: William Peck Pflug, Mercer Island, WA (US); Charles Briggs Spinelli, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 13/644,489

(22) Filed: Oct. 4, 2012

(65) Prior Publication Data

US 2014/0249702 A1    Sep. 4, 2014

(51) Int. Cl.
| | | |
|---|---|---|
| *B64C 25/26* | (2006.01) | |
| *B64C 25/00* | (2006.01) | |
| *B64C 25/32* | (2006.01) | |
| *B64D 45/04* | (2006.01) | |
| *B64C 25/52* | (2006.01) | |

(52) U.S. Cl.
CPC .............. *B64C 25/26* (2013.01); *B64C 25/001* (2013.01); *B64C 25/32* (2013.01); *B64D 45/04* (2013.01); *B64C 2025/008* (2013.01); *B64C 2025/325* (2013.01); *B64C 25/52* (2013.01)

(58) Field of Classification Search
CPC .. B64C 2025/008; B64D 45/04; B64D 45/06; B64D 45/08; G01S 1/18
USPC .................................... 244/104; 701/16, 124
See application file for complete search history.

(56) References Cited

U.S. PATENT DOCUMENTS

| | | | |
|---|---|---|---|
| 2,927,747 A | 3/1960 | Bennie | |
| 3,122,345 A | 2/1964 | Thule | |
| 3,857,533 A | 12/1974 | Mason | |
| 4,062,507 A | 12/1977 | Felder | |
| 4,780,838 A * | 10/1988 | Adelson | 702/174 |
| 5,521,827 A * | 5/1996 | Lindberg et al. | 701/124 |
| 6,588,701 B2 * | 7/2003 | Yavnai | 244/23 A |
| 2009/0008499 A1 * | 1/2009 | Shaw | 244/17.23 |
| 2011/0087424 A1 * | 4/2011 | Long et al. | 701/124 |

FOREIGN PATENT DOCUMENTS

| | | |
|---|---|---|
| JP | 2007 245925 | 9/2007 |
| SE | 118333 | 3/1947 |
| WO | WO 2010138654 | 12/2010 |

OTHER PUBLICATIONS

PCT International Search Report and Written Opinion dated Dec. 17, 2013 in PCT/US2013/061020.

* cited by examiner

*Primary Examiner* — Jerrah Edwards
*Assistant Examiner* — Tamara Weber
(74) *Attorney, Agent, or Firm* — Michael J. Baldauff, Jr.; Baldauff IP, LLC (57) ABSTRACT

A system for configuring landing supports of a load to land on uneven terrain includes a terrain sensor configured to detect a terrain characteristic of the uneven terrain. The system further includes landing supports configured to support the load upon landing. The system also includes a support control device operatively coupled to the landing supports, and a landing support control computer that is operatively coupled to the terrain sensor, landing supports, and support control device. The landing support control computer may determine if landing on the uneven terrain is allowable, based on the terrain characteristic and a load characteristic of the load. Upon determining that landing on the uneven terrain is allowable, the support control device configures the landing supports for landing on the uneven terrain.

23 Claims, 7 Drawing Sheets

CONFIGURING LANDING SUPPORTS FOR LANDING ON UNEVEN TERRAIN

BACKGROUND

Conventional landing supports for vertical takeoff and landing aircraft are commonly rigid, such as fixed helicopter skids. Consequently, an aircraft may not be capable of safely landing on terrain that is not level due to a slope, pitch, or other type of surface characteristic that makes a landing site uneven. Landing on uneven terrain can introduce risk of damage to the aircraft and its crew and cargo. As a result, some aircraft have limited ability to land in areas with uneven terrain, which may limit the utility of the aircraft in performing its intended functions such as transporting passengers or delivering supplies. It is with respect to these and other considerations that the various configurations described below are presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect, a method is described herein for landing on uneven terrain. The method may include detecting uneven terrain below a load descending for landing. In response to detecting the uneven terrain, one or more landing supports of the load may be configured to correspond with the uneven terrain.

According to another aspect, a method is described herein for landing an aircraft on uneven terrain. The method may include detecting a terrain characteristic of the uneven terrain and, based on the terrain characteristic and a load characteristic of the aircraft, determining if landing on the uneven terrain is allowable. In response to determining that landing on the uneven terrain is allowable, one or more landing supports may be configured to correspond to the uneven terrain.

According to yet another aspect, a system is described herein for configuring an aircraft for landing on uneven terrain. The system may include a terrain sensor configured to detect a terrain characteristic of the uneven terrain, and an attitude sensor configured to detect an attitude of the aircraft. The system may also include landing supports configured to support the aircraft upon landing, and a support control device that is coupled to the landing supports. A landing support control computer, with a processor and a memory device, is coupled to the terrain detector, attitude sensor, landing supports, and support control device. The landing support control computer may include a processor and a memory device and may be configured to determine if landing on the uneven terrain is allowable, based on the terrain characteristic and a load characteristic of the aircraft. In response to determining that landing on the uneven terrain is allowable, the support control device may configure one or more of the landing supports in order to approximately level the attitude of the aircraft upon landing on the uneven terrain.

The features, functions, and advantages that have been discussed can be achieved independently in various configurations of the present disclosure or may be combined in other configurations, further details of which can be seen with reference to the following description and drawings.

DETAILED DESCRIPTION

The following detailed description is directed to methods and a system for configuring landing supports of an aircraft or other load. As discussed above, conventional aircraft are not configured for vertical descent onto uneven terrain. However, utilizing concepts and technologies described herein, landing supports of an aircraft or other load may be configured for landing on uneven terrain. One or more characteristics of the uneven terrain at a potential landing area may be detected. If uneven terrain is detected prior to landing, according to some methods described herein, one or more of the landing supports may be preemptively configured to account for uneven terrain as detected. For example, landing supports of a helicopter may be preconfigured by adjusting the length of one of the landing supports relative to the length of another support and/or by regulating a pressure applied to one landing support relative to a pressure applied to another landing support. Upon doing so, upon touchdown, the helicopter is maintained at a level orientation whether the surface of the landing area is level or not. As used herein, "level" refers to an orientation that is in a plane parallel to the plane of the horizon. "Attitude" as used herein refers to the inclination of the three principal axes of an aircraft relative to the ground.

Alternatively, according to technologies described herein, landing supports of an aircraft may be configured upon landing on uneven terrain to maintain the aircraft at a level attitude whether the terrain of the landing area is level or not. For example, landing supports of a helicopter may be configured upon touchdown with the surface of uneven terrain to level the attitude of the helicopter and stabilize the position of the helicopter relative to the ground.

Practicing aspects described herein in accordance with various configurations may provide advantages that include reducing the time it takes for an aircraft to approach and land on an uneven surface by removing a significant portion of the landing burden from the pilot. Configurations described herein may improve the ability of an aircraft to land in low-visibility environments by reducing the reliance on pilot vision to identify suitable landing sites and safely land on uneven terrain. Low-visibility can be caused by fog, snow, or dust blown up by rotor blades. Additionally, ground resonance can occur whenever the rotor is turning while the aircraft is in contact with the ground. If recovery is ineffective, ground resonance can result in the loss of the entire aircraft. Configurations presented herein may reduce the risk of ground resonance by allowing the pilot to land on a slope and shut off the engine while remaining in a level orientation, rather than requiring the pilot to balance one landing support on the ground with partial power.

Although some configurations presented herein are described in the context of aircraft, it should be appreciated that the technologies described herein may be implemented for any object or load that is placed on uneven terrain. For instance, the concepts described herein may apply to a cargo load that is released from an aircraft and descends to a landing site, or to an object or load that is placed by a crane or other type of overhead delivery mechanism onto an uneven surface. Also, although some configurations presented herein describe an aircraft in the context of a helicopter, it should be appreciated that the technologies described herein may be practiced with other types of aircraft. Further, although some configurations herein may describe the landing supports in the context of landing supports attached to landing skids, it should be appreciated that landing supports may encompass supports configured for various other types of aircraft, for example landing supports for wheel-based landing gear. In the following detailed description, references are made to the accompanying drawings that form a part hereof, and which are shown by way of illustration, specific configurations, or examples. Referring now to the drawings, in which like numerals represent like elements through the several figures, methods and a system for configuring landing supports for an aircraft to land on uneven terrain will be described.

Figure 1A:
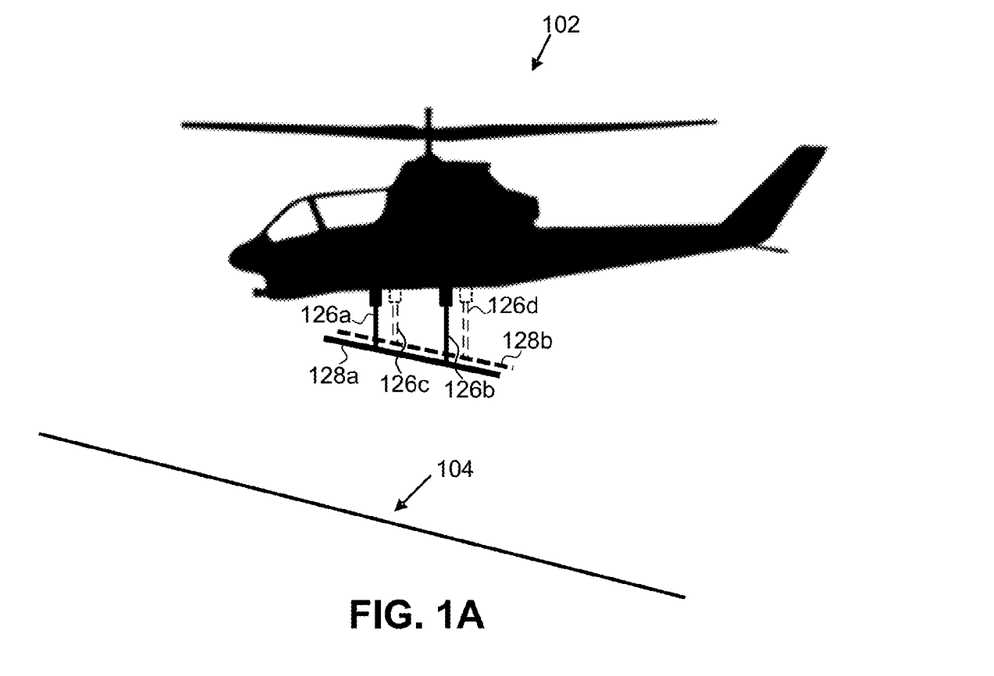
FIG. 1A shows a side view of an exemplary aircraft with a system for configuring landing supports, in accordance with some configurations disclosed herein.
Figure 1B:
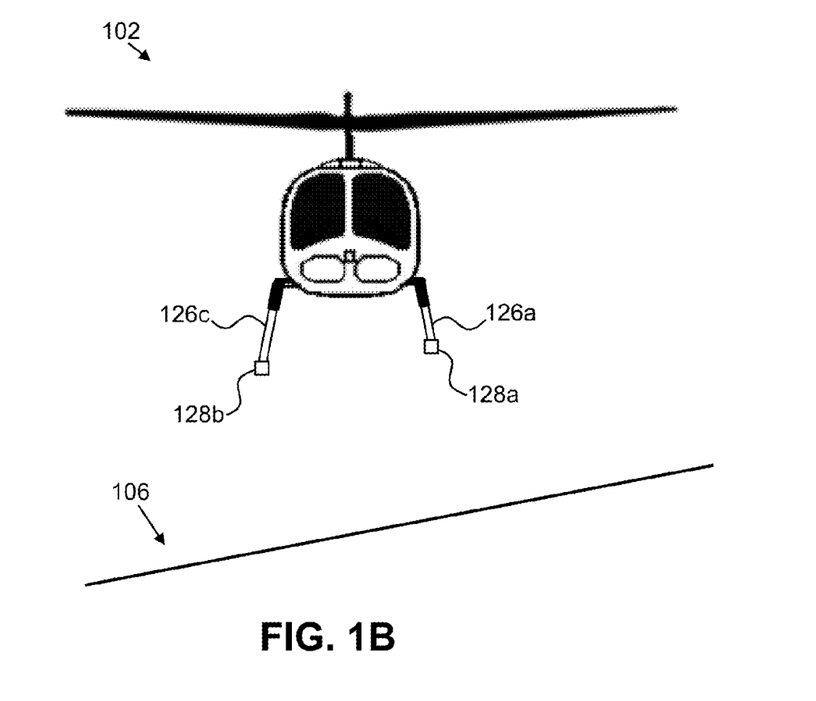
FIG. 1B shows a front view of an exemplary aircraft with a system for configuring landing supports, in accordance with some configurations disclosed herein.

The context of the concepts and technologies presented herein for configuring landing supports of an aircraft to land on uneven terrain are illustrated in FIGS. 1A and 1B. FIG. 1A illustrates an aircraft, in particular a helicopter 102 with landing supports 126a, 126b coupling a landing skid 128a to the fuselage of the helicopter 102. Similarly, as discussed below, it should be appreciated that with regard to FIG. 1B, the helicopter 102 may include a landing skid 128b and corresponding landing supports 126c, 126d on an opposite side of the helicopter 102. As shown in FIG. 1A, according to configurations described herein, the landing supports 126a, 126b may have preconfigured lengths to adjust for sloped terrain at a landing area 104. By configuring the landing support 126b to extend farther outwardly than the landing support 126a, in the example shown, the landing skid 128a is oriented to match the angle of the slope and position the helicopter 102 to be level upon landing. It should be appreciated that a common helicopter arrangement may include four landing supports 126a, 126b, 126c, 126d and two landing skids 128a, 128b.

FIG. 1B illustrates a helicopter 102 with landing skids 128a, 128b preconfigured for landing on side-sloped terrain 106. As shown, to compensate for the slope of the side-sloped terrain 106 in FIG. 1B, the landing support 126c is extended outwardly further than landing support 126a, such that the landing skids 128a, 128b are oriented to match the angle of the side-sloped terrain 106 and thereby position the helicopter 102 to be level upon landing. Although landing supports 126a, 126b are shown in FIG. 1A with the rear landing support 126b at a lower relative position than the front landing support 126a, and although landing support 126c is shown in FIG. 1B as being positioned lower relative to landing support 126a, it should be appreciated that the landing supports 126a, 126b, 126c, and 126d may be configured in various other relative positions to accommodate varying terrain.

Figure 2:
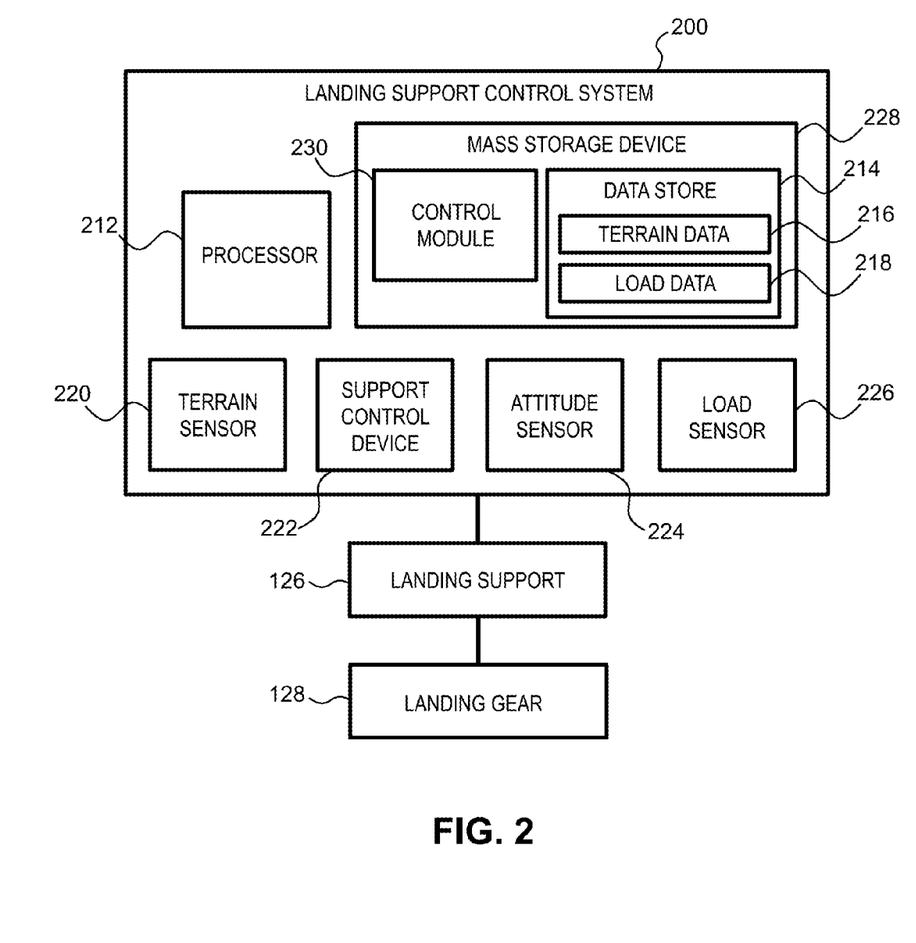
FIG. 2 is a block diagram illustrating a landing support control system architecture, in accordance with some configurations disclosed herein.

Referring now to FIG. 2, a landing support control system (LSCS) architecture is shown, in accordance with some configurations. In one configuration, the LSCS 200 includes a terrain sensor 220, support control device 222, attitude sensor 224, load sensor 226, and mass storage device 228 with a data store 214 configured to store terrain data 216 and load data 218. The terrain sensor 220 may be configured to detect one or more characteristics of terrain at a landing area. Terrain characteristics at the landing area may include, but are not limited, to pitch, slope, or unstable surface conditions. The terrain sensor 220 may further provide for real-time identification of obstacles at the landing area. For example, the terrain sensor 220 may be configured to detect moving objects in a field close to the landing area, such as vehicles, or to detect recent environmental changes, such as the presence of a rockslide at the landing area. The terrain sensor 220 may also be configured to detect unstable surface conditions at the landing area, which may include mud, loose rock, or unsettled material.

The terrain sensor 220 may include one or more sensing components including, but not limited to, ground sensors mounted internally or externally to the helicopter 102 and ground sensors configured to detect and navigate terrain at the landing area based on data corresponding to areas at or close to the landing area that have been previously mapped and the associated data previously stored as terrain data 216 in the data store 214. The terrain sensor 220 may also include radar systems, for example precision synthetic-aperture radar systems (SAR) configured to map the terrain at the landing area in real time. The terrain sensor 220 may also include sensors configured to detect surface instabilities of the terrain.

Data associated with the expected conditions of the terrain at a selected landing area, as detected by the terrain sensor 220, can be provided to the LSCS 200 prior to landing to allow for landing supports 126 to be preconfigured, i.e. preemptively configured. Prior to landing the aircraft at the landing area, one or more landing supports 126 may be preconfigured to compensate for the uneven terrain as detected by the terrain sensor 220. According to configurations, one or more support control devices 222 are operatively coupled to the landing supports 126. To adjust for the uneven terrain, the support control devices 222 may adjust the length of one or more of the landing supports 126 and/or adjust a pressure applied to one or more landing supports 126 such that when landing gear 128 of the aircraft contacts the surface of the terrain at the landing area, the aircraft is made level whether the surface of the landing area is level or not.

The support control devices 222 may include any type and quantity of components capable of adjusting the length of one or more of the landing supports 126 or adjusting the pressure applied to one or more of the landing supports 126. Examples of the support control devices 222 may include, but are not limited to, hydraulic, electric, or pneumatic actuators or regulators, as described in further detail below with regard to FIGS. 4 and 5. Although landing gear 128 described in one or more configurations may be presented in the context of landing skids of a helicopter, it should be appreciated that the landing skids 128 are not limited to landing skids and may encompass other types of landing gear such as wheeled aircraft landing gear.

The load characteristic of an aircraft, according to configurations described herein, may include base weight of the aircraft, weight of passengers, and/or payload of the aircraft. Accordingly, preconfiguration of the landing supports 126 may also be based on a total weight of the aircraft, including the base weight of the aircraft, weight of passengers, and/or a payload, which can be stored as load data 218 in the mass storage device 228.

In order for the total weight of the aircraft to be fully supported at landing, the total weight must be distributed among the landing supports 126. According to configurations, each landing support 126 may have a corresponding load sensor 226 that is configured to measure the load at the respective landing support 126 upon contact with the landing area, such that the configuration of the landing support 126 can be adjusted to equalize the portion of the total load supported by each of the landing supports 126. For example, each of four landing supports of a helicopter may have a load sensor 226 configured to measure the load at each support upon contact of the skids with the surface of the terrain, such that the configuration of the supports can be adjusted to equalize the portion of the total load supported by each of the supports. The load sensors 226 may provide data on a load or pressure measured at one or more of the landing supports 126, due to factors including, but not limited to, the total weight of the aircraft upon contact with the surface of the landing area, in order for a configuration of the landing supports 126 to be adjusted in response.

The LSCS 200 further includes a processor 212 and a control module 230 residing in the mass storage device 228, which, according to some configurations, may collectively form a landing support control computer. The control module 230 may be configured to, when executed by the processor 212, determine if the aircraft may land safely at the landing area, based on detected terrain at the landing area and/or one or more load characteristics of the aircraft. The control module 230 may be configured to, when executed by the processor 212, determine if the landing terrain is unsafe following the initial touchdown, which may be due to unstable surface conditions.

Figure 3:
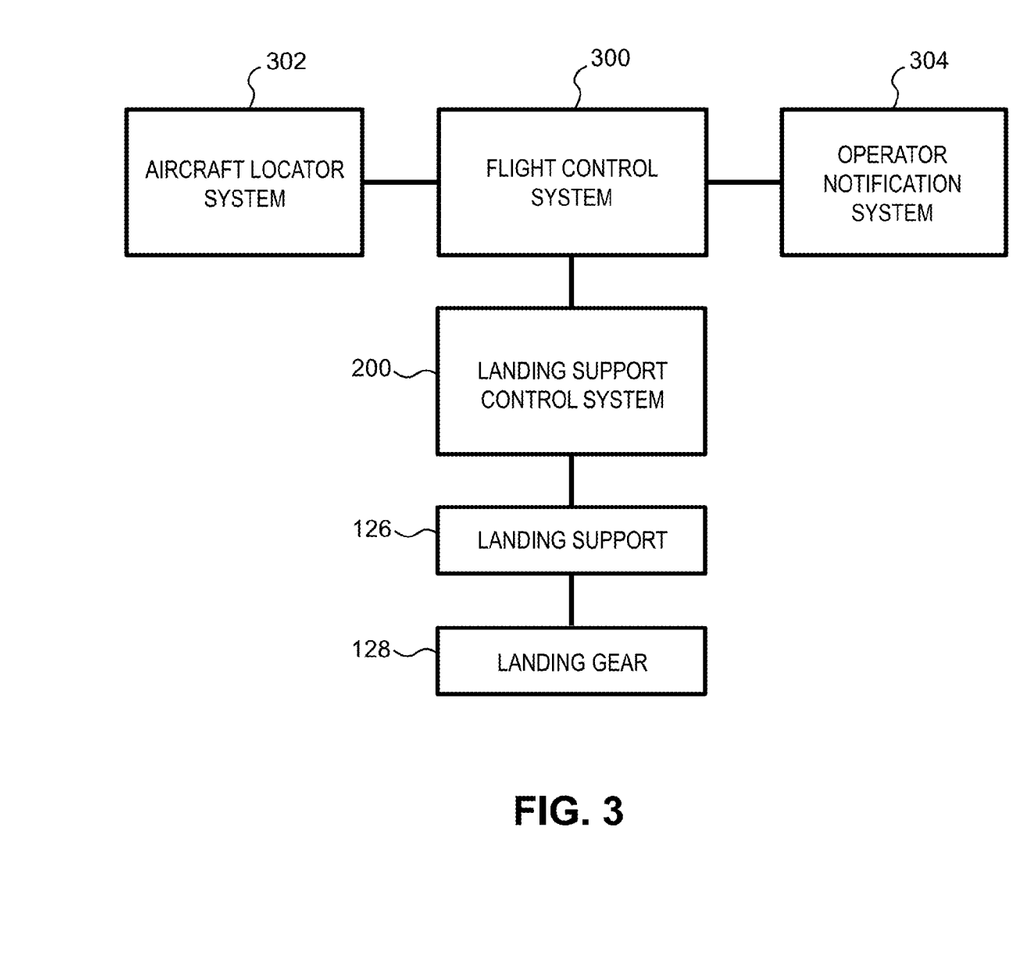
FIG. 3 is a block diagram illustrating a computing system environment including a landing support control system according to some configurations disclosed herein.

Now also referring to FIG. 3, according to configurations, the control module 230 may be configured to, when executed by the processor 212, notify an operator of the aircraft via an operator notification system 304, to indicate if a selected landing area is not safe. Landing locations with terrain that falls within the operating range of the aircraft, i.e. landing locations that are determined to be safe prior to landing, may be displayed to the operator on an in-flight display (not shown). Whether or not a landing area is safe prior to landing may be determined based on factors including, but not limited to, the known geometry and/or real-time orientation of the aircraft and the geometry of the landing site, which may be obtained via stored terrain data and/or detected by the terrain sensor 220 and attitude sensor 224. For example, by utilizing the operator notification system 304, a warning may be provided to the operator of the aircraft that landing at a particular site may result in a blade strike or similar damage to the aircraft.

Some landing areas may have a slope or pitch at an angle so large that the aircraft may be in danger of sliding or rolling uncontrollably if the aircraft were to attempt to land. In such an instance where exceedingly dangerous conditions exist at a landing area, an operator of the aircraft may be notified via the operator notification system 304 that the conditions at the landing area would prevent a safe landing. The operator notification system 304 may also be configured to warn the operator of the aircraft if, upon touchdown of the aircraft on the terrain at the landing area, conditions at the surface of the terrain are unstable. The operator notification system 304 may include an aural or visual alarm (not shown) to indicate unsafe conditions at a landing area.

As shown in FIG. 3, according to configurations, the landing support control system 200 may be operatively coupled to a flight control system 300 that is operative to control other functions for operating an aircraft as known to those skilled in the art. The attitude sensor 224 may include one or more geolocation sensors such as global positioning systems (GPS) and/or one or more orientation sensors such as a compass, which can be configured to detect an aircraft position and orientation relative to a selected landing area in order for the landing supports 126 to be preconfigured. One or more components of the attitude sensor 224 may reside in an aircraft locator system 302. The aircraft locator system 302 may be located at the aircraft or a remote location.

Figure 4:
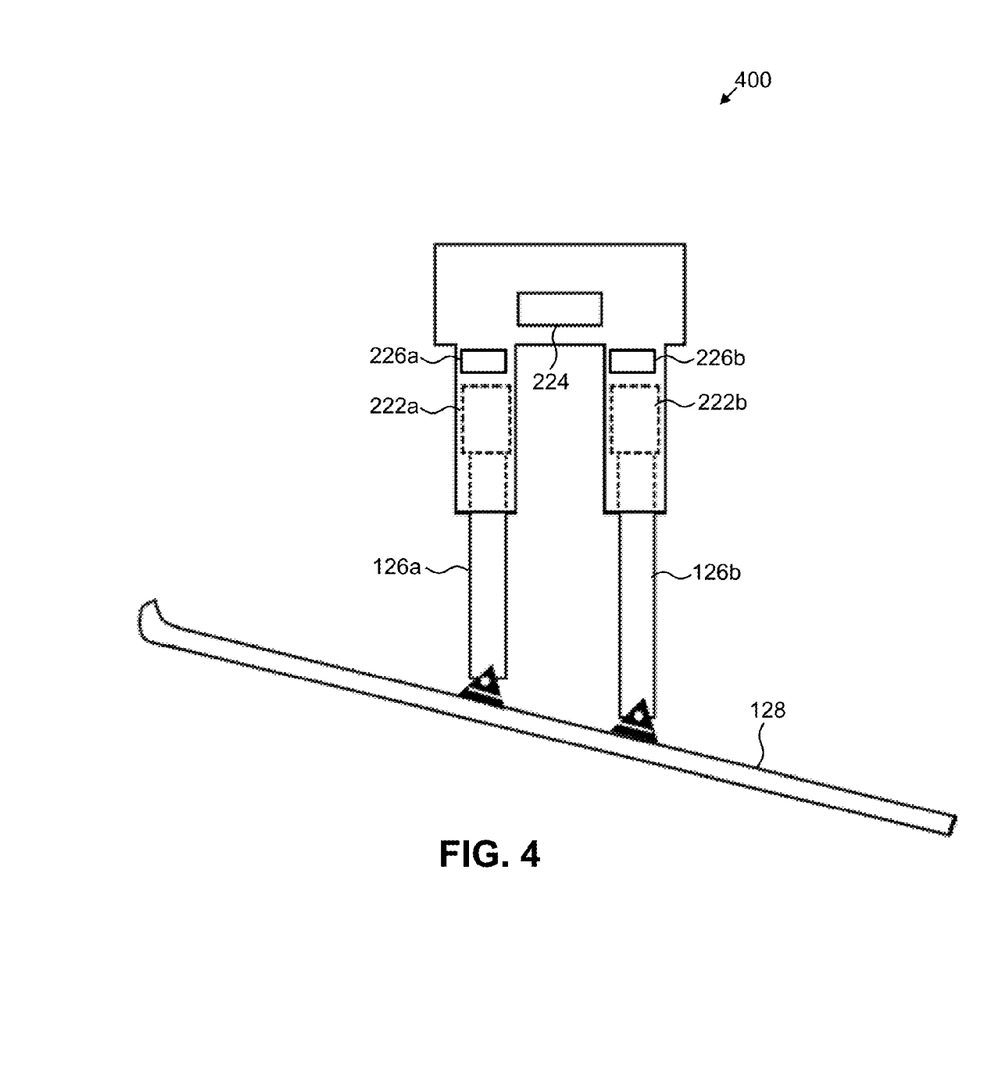
FIG. 4 illustrates a system for preconfiguring landing supports of an aircraft prior to landing, in accordance with some configurations disclosed herein.

Referring now to FIG. 4, a system for configuring landing supports of an aircraft prior to landing is shown, in accordance with some configurations disclosed herein. In particular, FIG. 4 shows a system 400 for configuring landing supports 126a, 126b coupled to a landing skid 128. As shown, landing supports 126a, 126b are configured to have particular lengths set to compensate for sloped terrain at a landing area. By configuring the landing support 126b to extend farther outwardly than the landing support 126a, the landing skid 128 is oriented in such a way as to conform to the slope, pitch, or other form of uneven terrain at the surface of the landing area, to position the aircraft in a level orientation upon landing.

Actuators 222a, 222b are operatively coupled to the landing supports 126a, 126b and configured to adjust for the uneven terrain by adjusting the relative length of landing support 126a relative to landing support 126b such that when the landing skid 128 contacts the surface of the terrain at the landing area, the aircraft is made level whether the surface of the landing area is level or not. The actuators 222a, 222b may include, but are not limited to, mechanical or electrical linear actuators and/or hydraulic or pneumatic actuators or regulators.

Load sensors 226a, 226b are configured to measure the load at corresponding landing supports 126a, 126b upon touchdown, such that the configuration of the landing supports 126a, 126b can be adjusted to equalize the portion of the total load supported by the landing supports 126a, 126b. The load sensors 226a, 226b may provide data on a load or pressure measured at one or more of the landing supports 126a, 126b, due to factors including, but not limited to, the total weight of the aircraft upon contact with the surface of the landing area in order for a configuration of the landing supports 126a, 126b to be adjusted in response.

An attitude sensor 224 is coupled to the actuators 222a, 222b and load sensors 226a, 226b. The attitude sensor 224 can be configured to detect an aircraft position and orientation relative to a selected landing area in order for the landing supports 126a, 126b to be preconfigured in a precise orientation such that the aircraft remains level upon landing at the landing area. Upon touchdown of the aircraft at the landing area, landing supports 126a, 126b would adjust in length or applied pressure until an equal portion of the total weight of the aircraft is carried as measured by the load sensors 226a, 226b. The attitude sensor 224 may include a motion sensor (not shown) such as an accelerometer configured to determine upon touchdown if the aircraft is stable relative to the surface of the contacted terrain. The motion sensor may detect shifts in the position of the aircraft due to surface instabilities, which may be attributable to mud, loose rock, or unsettled material.

Figure 5:
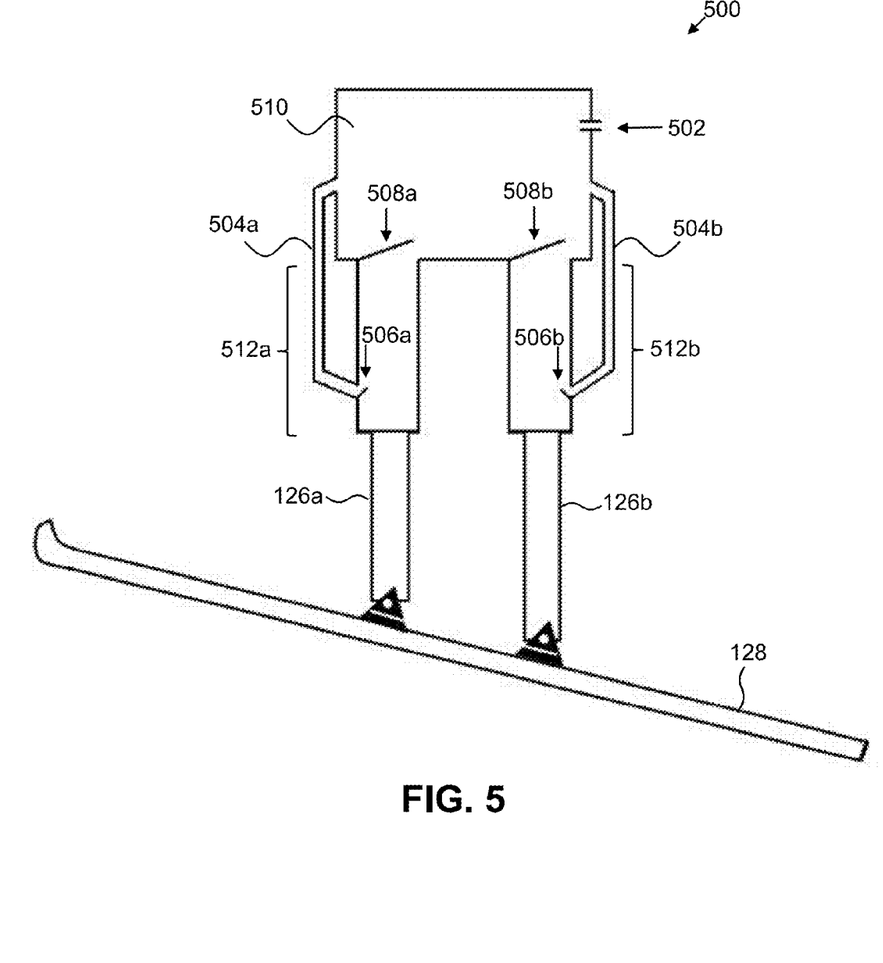
FIG. 5 illustrates a system for configuring landing supports of an aircraft upon landing, in accordance with some configurations disclosed herein.

Referring now to FIG. 5, an exemplary system 500 is shown for configuring landing supports of an aircraft upon landing, in accordance with some configurations disclosed herein. A hydraulic reservoir 510 stores hydraulic fluid to operate the movable landing supports 126a, 126b. The hydraulic reservoir 510 has a bleed valve 502 that is operative to reduce the hydraulic reservoir 510 pressure if the pressure rises above a desired final pressure of the system 500, that is, a predetermined final pressure. Channels 504a, 504b and one-way valves 506a, 506b allow fluid to flow from the hydraulic reservoir 510 into the support assemblies 512a, 512b until the landing supports 126a, 126b begin to compress and the one-way valves 506a, 506b are closed. Each support assembly 512a, 512b includes a one-way valve 508a, 508b that allows fluid to flow into the hydraulic reservoir 510 throughout the landing process. Each of the one-way valves 506a, 506b may be configured to open if a pressure in a respective landing support assembly 512a, 512b exceeds the hydraulic reservoir 510 pressure. As shown, one landing support 126a may collapse relative to the other landing support 126b.

The current weight of the aircraft may be used to calculate the final pressure levels. The bleed valve 502 may then be adjusted to bleed off any excess pressure. In one configuration, the initial hydraulic reservoir 510 pressure is set to the pressure that will result in half compression of landing supports 126a, 126b when the aircraft lands. When a first one of the landing supports 126a, 126b impacts the ground, the pressure in the corresponding support assembly 512a, 512b begins to rise, i.e. the pressure changes from the initial pressure level towards a desired final pressure, due to the landing support compression. The valve system comprised of the bleed valve 502, channels 504a, 504b, and one-way valves 506a, 506b, 508a, and 508b insures that the hydraulic reservoir 510 and the other one of the landing supports 126a, 126b remains at the same pressure as the first one of the landing supports 126a, 126b. When the second landing support impacts the ground, the pressure in the second landing support begins to rise independently of the pressure in the first landing support. Whichever landing support has the higher pressure will open to the hydraulic reservoir 510 and equalize pressure with the hydraulic reservoir 510.

The one-way valves 508a, 508b from the support assemblies 512a, 512b to the hydraulic reservoir 510 keep the landing supports 126a, 126b at approximately the same pressure level as the hydraulic reservoir 510. For a configuration with four landing supports (not shown), the bleed valve 502 in the hydraulic reservoir 510 insures that no one landing support can carry more than one-quarter of the aircraft weight, and thus the aircraft continues to sink upon landing until the four landing supports have contacted the ground. The one-way valves 506a, 506b from the hydraulic reservoir 510 to the support assemblies 512a, 512b keep the pressure level of landing supports 126a, 126b at the hydraulic reservoir 510 level until the landing support 126a, 126b hits the ground. The motion of the landing support cuts off the pressure valve, preventing pressure rises in other landing supports from causing the other landing support to expand. When all landing supports have contacted the ground, the system 500 will continue to sink until the final pressure has been reached. At this point each landing support will be carrying one-quarter of the aircraft weight in a statically stable arrangement. To prevent leakage after landing, valves can be mechanically locked after the aircraft has reached a stable orientation.

Figure 6:
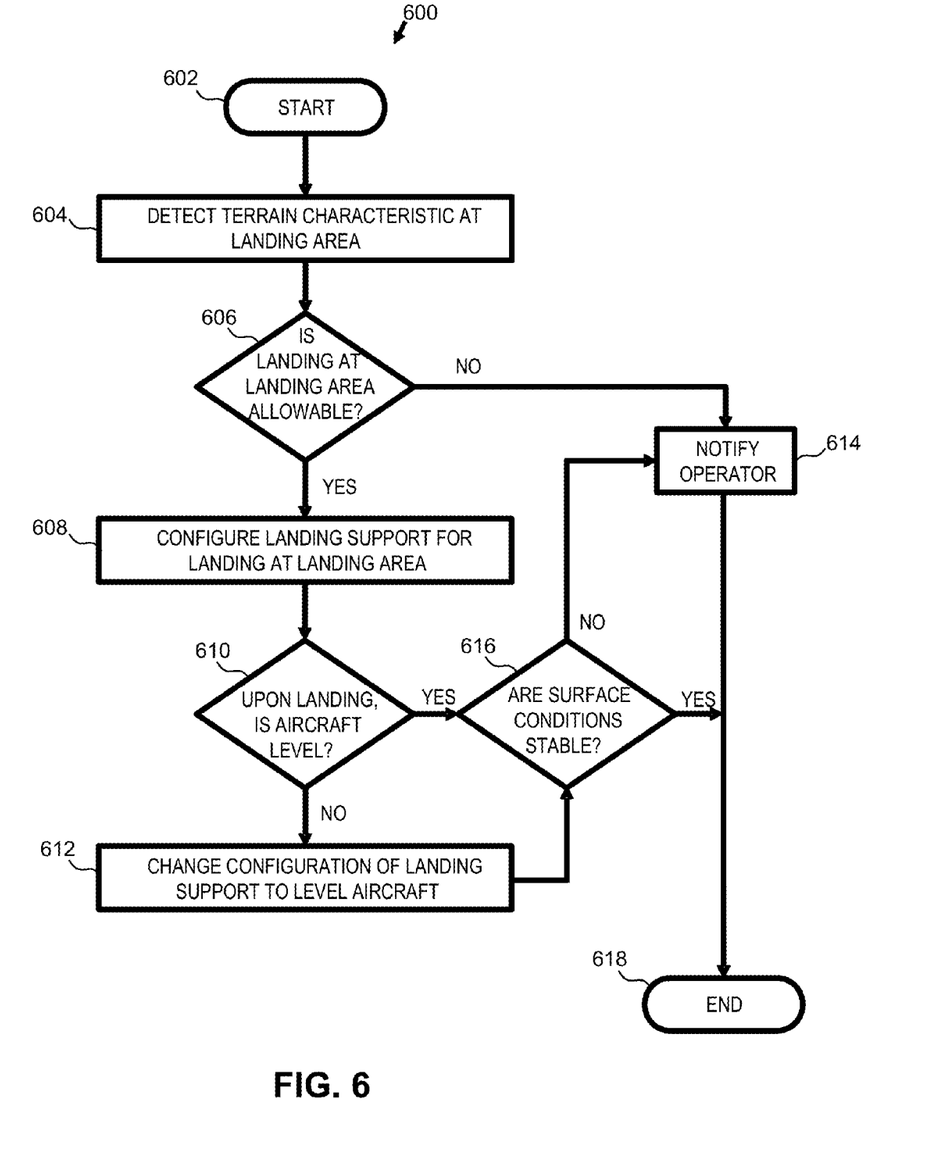
FIG. 6 is a flow diagram illustrating aspects of an example method provided herein for configuring landing supports of an aircraft, in accordance with some configurations disclosed herein.

Referring now to FIG. 6, additional details will be provided regarding the operation of the control module 230. In particular, FIG. 6 is a method 600 illustrating aspects of an exemplary method provided herein for configuring landing supports of an aircraft, in accordance with some configurations. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

As shown in FIG. 6, a method 600 begins at operation 602 and proceeds to operation 604, where one or more terrain characteristics of a landing area are detected. The terrain characteristics may include a pitch, slope, or the presence of obstacles or unstable surface conditions associated with the landing area. As discussed above, detection may utilize a terrain sensor that may include one or more sensing components including, but not limited to, ground sensors mounted internally or externally to the aircraft. The terrain sensor may also include, according to configurations described herein, ground sensors configured to detect and navigate terrain at the landing area, based on data corresponding to areas at or close to the landing area that have been previously mapped, and the associated data previously stored as terrain data. The terrain sensor may also include radar systems, for example precision synthetic-aperture radar systems (SAR) configured to map the terrain at the landing area in real time.

From operation 604, the method proceeds to operation 606, where it is determined if landing at the landing area is allowable, which may be based on the detected terrain at the landing area, information from the terrain database, and/or one or more load characteristics of the aircraft. The load characteristic may be associated with a total load force corresponding to the total weight of the aircraft. If landing at the landing area is not allowable, then the method 600 proceeds from operation 606 to operation 614, where an operator of the aircraft is notified that landing at the landing area is not allowable and the method 600 ends at operation 616.

If landing at the landing area is allowable, then the method 600 proceeds from operation 606 to operation 608, where one or more landing supports of the aircraft are configured for landing at the landing area. Configuring the landing supports may include extending or retracting one or more of the landing supports relative to another one or more of the landing supports. Configuring the landing supports may additionally or alternatively include changing a pressure on one or more of the landing supports relative to the pressure on another one or more of the landing supports. The method 600 then proceeds from operation 608 to operation 610, where upon landing, it is determined if the aircraft is level. This may be determined based on load data detected by attitude sensors or load sensors at one or more of the landing supports. If the aircraft is level, then the method 600 proceeds from operation 610 to operation 616. If the aircraft is not level, then the method 600 proceeds to operation 612, where the configuration of one or more of the landing supports is changed in order to level the aircraft, and the method 600 then proceeds to operation 616.

At operation 616, it is determined if the terrain is unstable, which may be detected by motion sensors such as accelerometers configured to sense shifts of the aircraft relative to the contacted surface of the terrain. If the terrain is stable, then method 600 proceeds from operation 616 to operation 618, where the method 600 ends. If the terrain is unstable, then the method 600 proceeds from operation 616 to operation 614, where an operator of the aircraft is notified that conditions on the surface of the terrain are unstable, and the method 600 then ends at operation 618.

Figure 7:
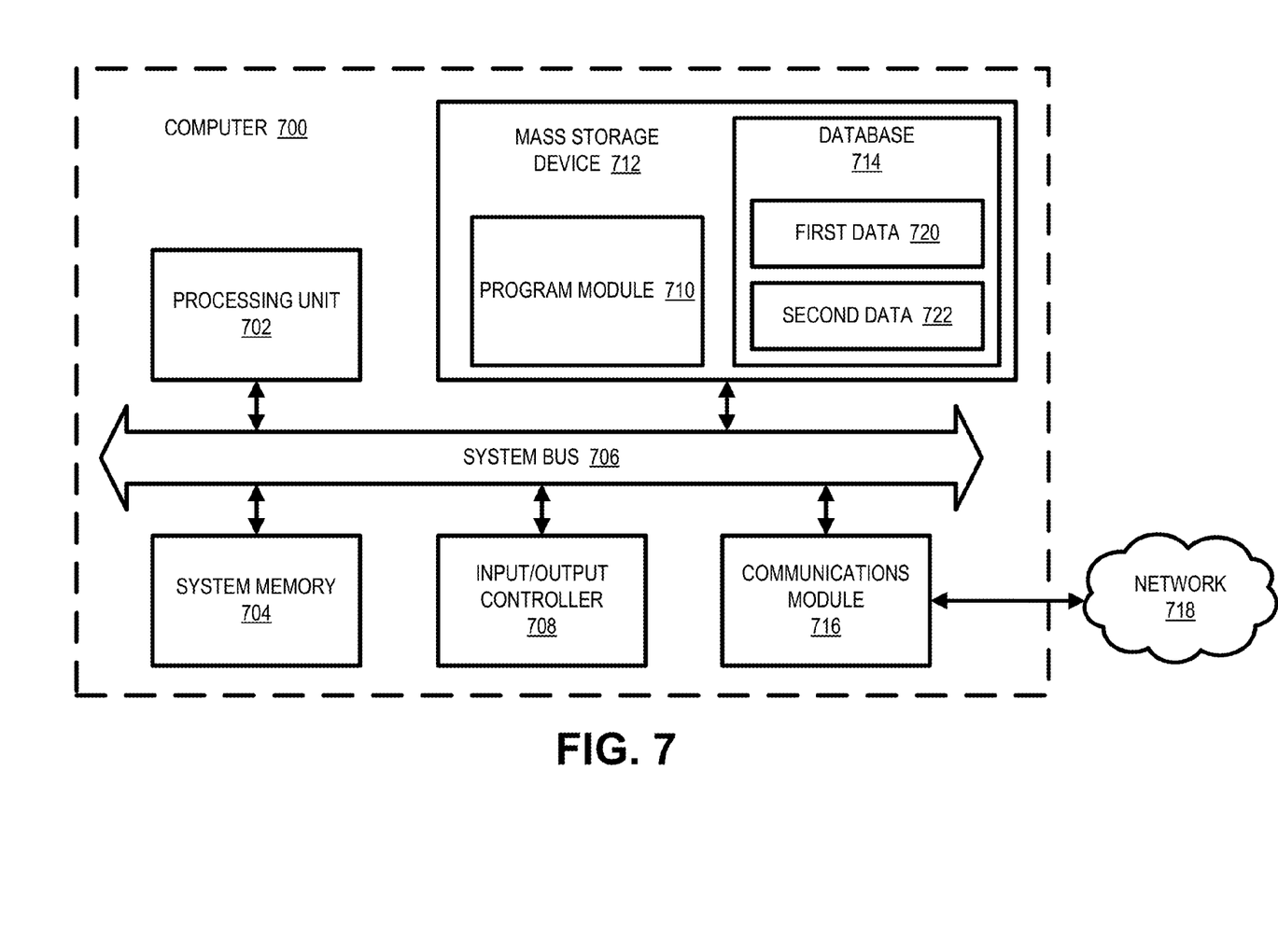
FIG. 7 is a computer architecture diagram showing aspects of an illustrative computer hardware architecture for a computing system capable of implementing aspects of the configurations disclosed herein.

Referring now to FIG. 7, an exemplary computer architecture diagram showing aspects of a computer 700 is illustrated.

The computer 700 may include the landing support control system 200 and/or the flight control system 300. The computer 700 may be configured to execute a program module 710, which may include the control module 230. The computer 700 includes a central processing unit 702 ("CPU"), a system memory 704, and a system bus 706 that couples the system memory 704 to the CPU 702. The computer 700 further includes a mass storage device 712 for storing program modules, including program module 710 as shown, and one or more databases 714. For example, the databases 714 may store various types of data, generally shown as first data 720 and second data 722, among other information. First data 720 and/or second data 722 may include the terrain data 216 or load data 218 as shown in FIG. 2. The mass storage device 712 is connected to the CPU 702 through a mass storage controller (not shown) connected to the system bus 706. The mass storage device 712 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various configurations, the computer 700 may operate in a networked environment using logical connections to remote computers through a network 718. The computer 700 may connect to the network 718 through a communications module 716 connected to the system bus 706. It should be appreciated that other types of communications modules may be utilized to connect to other types of networks and remote computer systems. The computer 700 may also include an input/output controller 708 for receiving and processing input from a number of input devices (not shown), including a keyboard and a mouse. Similarly, the input/output controller 708 may provide output to a display or other type of output device (not shown) connected directly to the computer 700.

Those skilled in the art will recognize that the concepts and technology presented herein can be configured in various ways. The subject matter described above is provided by way of illustration only and should not be construed as limiting. Various modifications and changes may be made to the subject matter described herein without following the exemplary configurations and applications illustrated and described, and without departing from the true spirit and scope of the present disclosure, which is set forth in the following claims.

The invention claimed is:

1. A computer-implemented method for landing on uneven terrain, comprising:
    detecting with a landing support control computer uneven terrain below a load descending for landing; and
    in response to detecting the uneven terrain, provide instructions from the landing support control computer to a support control device operatively coupled to at least one landing support of the load to configure the at least one landing support of the load.

2. The method of claim 1, wherein configuring the at least one landing support comprises changing a length of the at least one landing support.

3. The method of claim 1, wherein configuring the at least one landing support comprises adjusting a pressure on the at least one landing support.

4. The method of claim 3, wherein adjusting the pressure on the at least one landing support comprises changing the pressure from an initial pressure to a predetermined final pressure.

5. The method of claim 1, wherein configuring the at least one landing support comprises configuring the at least one landing support based on a load force corresponding to a total weight of the load.

6. The method of claim 1, further comprising
    upon landing on the uneven terrain, determining with the landing support control computer if an attitude of the load is level, and
    upon determining that the attitude of the load is not level, provide instructions from the landing support control computer to the support control device to configure the at least one landing support to approximately level the attitude of the load.

7. The method of claim 1, further comprising
    upon landing on the uneven terrain, determining with the landing support control computer if conditions on a surface of the uneven terrain are stable, and
    upon determining that the conditions on the surface of the uneven terrain are unstable, providing a notification from the landing support control computer to an operator associated with the load that conditions on the surface of the uneven terrain are unstable.

8. The method of claim 6, wherein determining if the attitude of the load is level comprises receiving load sensor data from a load sensor operatively coupled to the at least one landing support.

9. A computer-implemented method for landing an aircraft on uneven terrain, comprising:
    detecting with a landing support control computer a terrain characteristic of the uneven terrain;
    determining with the landing support control computer if landing on the uneven terrain is allowable based on the terrain characteristic and a load characteristic of the aircraft; and
    upon determining that landing on the uneven terrain is allowable, providing instructions from the landing support control computer to a support control device operatively coupled to a plurality of landing supports of the load to configure at least one of the plurality of landing supports.

10. The method of claim 9, wherein detecting the terrain characteristic of the uneven terrain comprises detecting at least one of a pitch, slope, and surface condition associated with the uneven terrain.

11. The method of claim 9, wherein configuring the at least one landing support comprises adjusting a length of the at least one landing support relative to another at least one of the plurality of landing supports.

12. The method of claim 9, wherein configuring the at least one landing support comprises changing a pressure on the at least one landing support relative to a pressure on another at least one of the plurality landing supports.

13. The method of claim 9, wherein the load characteristic of the aircraft is associated with a load force corresponding to a total weight of the aircraft.

14. The method of claim 9, further comprising, upon determining that landing on the uneven terrain is allowable,
    upon landing on the uneven terrain, determining with the landing support control computer if an attitude of the aircraft is approximately level; and
    upon determining that the attitude of the aircraft is not approximately level, providing instructions from the landing support control computer to the support control device to change the configuration of the at least one landing support to approximately level the attitude of the aircraft.

15. The method of claim 14, wherein determining if the attitude of the aircraft is level upon landing on the uneven terrain comprises receiving load data from a load sensor operatively coupled to the at least one landing support.

16. The method of claim 9, further comprising, upon determining that landing on the uneven terrain is not allowable, providing a notification from the landing support control computer to an operator of the aircraft that landing on the uneven terrain is not allowable.

17. A system for configuring an aircraft for landing on uneven terrain, comprising:
    a terrain sensor configured to detect a terrain characteristic of the uneven terrain;
    an attitude sensor configured to detect an attitude of the aircraft;
    a plurality of landing supports, coupled to landing gear, configured to support the aircraft upon landing;
    a support control device operatively coupled to the plurality of landing supports; and a
    landing support control computer having a processor and a memory device and operatively coupled to the terrain sensor, attitude sensor, plurality of landing supports, and support control device, configured to
        determine if landing on the uneven terrain is allowable based on the terrain characteristic of the uneven terrain detected by the terrain sensor and a load characteristic of the aircraft, and
        upon determining that landing on the uneven terrain is allowable,
            cause the support control device to configure at least one of the landing supports to approximately level the attitude of the aircraft upon landing on the uneven terrain.

18. The system of claim 17, wherein configuring at least one of the plurality of landing supports comprises causing the support control device to adjust a length of at least one of the plurality of landing supports relative to another at least one of the plurality of landing supports.

19. The system of claim 17, wherein configuring at least one of the plurality of landing supports comprises causing the support control device to adjust a pressure applied to at least one of the plurality of landing supports relative to a pressure applied to another at least one of the plurality of landing supports.

20. The system of claim 17, wherein the support control device comprises at least one of an actuator and a regulator.

21. The system of claim 17, wherein the landing support control computer is further configured to, upon determining that landing on the uneven terrain is not allowable, cause a notification system to notify an operator of the aircraft that landing on the uneven terrain is not allowable.

22. The system of claim 17, wherein detecting the terrain characteristic of the uneven terrain comprises causing the terrain sensor to detect at least one of a pitch, slope, and unstable surface condition associated with the uneven terrain.

23. The system of claim 17, further comprising a load sensor operatively coupled to the landing support control computer and at least one of the landing supports, the landing support control computer further configured to receive load data from the load sensor and, upon landing of the aircraft on the uneven terrain, determine if the attitude of the aircraft is level based on the load data received from the load sensor.

\* \* \* \* \*